United States Patent
Waller et al.

(10) Patent No.: US 12,054,407 B1
(45) Date of Patent: Aug. 6, 2024

(54) APPARATUS, METHODS AND SYSTEMS FOR TREATING OIL-IN-WATER EMULSIONS

(71) Applicant: The Government of the United States of America, as represented by the Secretary of the Navy, Arlington, VA (US)

(72) Inventors: Gordon H. Waller, Vienna, VA (US); Danielle M. Paynter, Vienna, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/869,728

(22) Filed: May 8, 2020

(51) Int. Cl.
C02F 1/48 (2023.01)
C02F 1/463 (2023.01)
C02F 101/32 (2006.01)

(52) U.S. Cl.
CPC .............. *C02F 1/463* (2013.01); *C02F 1/488* (2013.01); *B01D 2259/80* (2013.01); *C02F 2101/32* (2013.01); *C02F 2201/46135* (2013.01); *C02F 2201/4614* (2013.01); *C02F 2209/02* (2013.01); *C02F 2303/18* (2013.01)

(58) Field of Classification Search
CPC .............................. C02F 1/488; C02F 2303/18
See application file for complete search history.

(56) References Cited

U.S. PATENT DOCUMENTS 10,155,179 B2    12/2018    Mahmoudi et al.
2015/0233867 A1*  8/2015    Klyamkin .............. C02F 1/488
                                                            324/204

FOREIGN PATENT DOCUMENTS

CN          104529018 A  *  4/2015

OTHER PUBLICATIONS

Tsouris, C., et al. "Electrocoagulation for magnetic seeding of colloidal particles." Colloids and Surfaces A: Physicochemical and Engineering Aspects 177.2-3 (2001): 223-233. (Year: 2001).*
Lin, C., et al. "Pilot-scale studies of sulfur and ash removal from coals by high gradient magnetic separation." IEEE Transactions on Magnetics 12.5 (1976): 513-521. (Year: 1976).*
Oberteuffer, J. "High gradient magnetic separation." IEEE Transactions on Magnetics 9.3 (1973): 303-306. (Year: 1973).*
Hafez, Omar M., et al. "Removal of scale forming species from cooling tower blowdown water by electrocoagulation using different electrodes." Chemical Engineering Research and Design 136 (2018): 347-357. (Year: 2018).*
Zhou Y—CN-104529018-A Fit translation—Apr. 2015 (Year: 2015).*
C. An, et al., "Emerging usage of electrocoagulation technology for oil removal from wastewater: a review," Sci. Total Environ. 579 (2017) 537-556.
B. Beverskog et al., "Revised Pourbaix Diagrams from Iron at 25 to 300°C," Corros. Sci. 38 (1996) 2121-2135.

(Continued)

*Primary Examiner* — Bradley R Spies
(74) *Attorney, Agent, or Firm* — Dawn C. Russell; Howard Kaiser

(57) ABSTRACT

Apparatus, methods, and systems are provided for treating oil-in-water emulsions by in situ production of magnetic $FeO_x$ nanoparticles.

11 Claims, 10 Drawing Sheets

(56) References Cited

OTHER PUBLICATIONS

Gordon H. Waller, Curtis A. Martin, Nicholas J. Jones, Danielle M. Paynter, "Treatment of Oil-in-Saltwater Emulsions by In-Situ Production of Magnetic FeOx Nanoparticles," Journal of Water Process Engineering, published by Elsevier Ltd., vol. 31, Oct. 2019, 100851, accepted May 3, 2019, available online May 10, 2019, version of record May 10, 2019 (May 3, 2019 manuscript is submitted herewith).

ScienceDirect webpage relating to Gordon H. Waller, Curtis A. Martin, Nicholas J. Jones, Danielle M. Paynter, "Treatment of Oil-in-Saltwater Emulsions by In-Situ Production of Magnetic FeOx Nanoparticles," Journal of Water Process Engineering, published by Elsevier Ltd., vol. 31, Oct. 2019, 100851, accepted May 3, 2019, available online May 10, 2019, version of record May 10, 2019, https://www.sciencedirect.com/science/article/abs/pii/S2214714419301928, webpage printed out on Aug. 25, 2022.

* cited by examiner

APPARATUS, METHODS AND SYSTEMS FOR TREATING OIL-IN-WATER EMULSIONS

FIELD OF THE INVENTION

This invention is directed to apparatus, methods, and systems for treating oil-in-water emulsions by in situ production of magnetic $FeO_x$ nanoparticles.

BACKGROUND OF THE INVENTION

Wastewater treatment involves the removal of contaminants deemed ecologically or biologically hazardous before discharging the treated water back into the environment. Because water is generally a good solvent, many such undesirable contaminants can be dissolved in a wastewater stream. Wastewater treatment systems must be optimized to treat targeted contaminants, meet any required effluent conditions, and operate efficiently.

Treatment systems must meet rigorous space and energy constraints, while providing highly efficient treatment at low cost, particularly when provided aboard naval vessels.

Wastewater treatment has been accomplished through a combination of gravity separation techniques to remove bulk solutes of varying densities, mechanical filtration to remove solid materials as well as colloids and particulates (depending on the pore size of the filter used), and/or chemical treatments to produce flocs or precipitate contaminants out of the waste stream. Produced flocs and precipitates can be removed by follow-on mechanical filtration or other mechanical separation processes. However, these treatment methods all suffer from a variety of drawbacks.

Gravity separation efficiently removes bulk solutes of varying densities that might otherwise quickly foul more refined treatment processes, and provides a high throughput. However, it is ineffective at removing small particulates, and requires non-practical processing times to reach required effluent standards.

Oil removal from shipboard wastewater streams is typically achieved by mechanical filtration, which operates using simple principles. A variety of filters are available for rejection of various particles sizes. They exhibit high chemical resistance, and have proven treatment reliability. Filtration methods are subject to fouling of the filter surface (particularly microporous membranes), which leads to dramatic decreases in flow rate with continued use, and increases in the cost associated with maintenance. Replacing filters frequently can be time consuming. Cleaning and/or regeneration procedures are also time consuming, and require shipboard storage of cleaning solutions. Chemically-resistant ceramic membranes are brittle and prone to fractures and other physical damage during shipment and installation.

Chemical treatment of wastewater is beneficial because multiple chemical additives are available for treatment of a wide variety of influents. The type and concentration of additives are targeted to specific influent compositions, so the chemicals required can vary widely. In some cases, the additive may only be active at the surface/wastewater interface. Chemicals added to a wastewater stream may require downstream remediation. Finally, storage, safety, and procurement logistics for the required chemicals can be challenging.

Electrocoagulation (EC), also referred to as electroflocculation, is an alternative technique for disrupting oil-in-water emulsions by in situ production of metal cations via electrochemical oxidation of a sacrificial metal anode, typically Fe or Al (C. An, et al., "Emerging usage of electrocoagulation technology for oil removal from wastewater: a review," *Sci. Total Environ.* 579 (2017) 537-556). Introduction of metal cations into the emulsion can destabilize the surface charge of colloidal particles, allowing oil droplets to coalesce and form flocs, while gas formation during the electrochemical process aids in floating these flocs to the surface of the wastewater solution for removal by skimming. However, EC can be limited by electrode life span unless the electrodes are cleaned regularly, often requiring highly caustic chemicals.

The available wastewater treatment techniques do not address the need for rapid treatment of wastewater, particularly wastewater that includes oil-in-water emulsions, such as naval vessel bilgewater.

SUMMARY OF THE INVENTION

The invention described herein, including the various aspects and/or embodiments thereof, meets the unmet needs of the art, as well as others, by providing apparatus, systems, and methods for treating oil-in-water emulsions by in situ production of magnetic nanoparticles.

According to a first aspect of the invention, an EC apparatus is provided. The apparatus includes an influent channel for receiving an oil-in-water emulsion; an EC chamber that includes: a holding tank for the oil in water emulsion; at least two electrodes comprising Fe provided at a separation distance; a source of applied voltage or current in communication with the electrodes; and an effluent channel for discharging an EC effluent comprising magnetic particles; a sensor for sensing induced voltage resulting from flow of EC effluent comprising magnetic particles through effluent channel.

In some aspects, the EC apparatus includes a controller for adjusting EC reaction parameters in the EC chamber. EC reaction parameters are selected from the group consisting of applied voltage or current, separation distance, solution temperature, mechanical stirring, and combinations thereof.

The EC apparatus may further include a magnetic field provided in the effluent channel.

In another aspect of the invention, an EC method is provided. The method includes providing an influent comprising an oil-in-water emulsion; performing EC on the influent using at least two electrodes comprising Fe, where the at least two electrodes are in communication with a source of applied voltage or current, thereby generating an EC effluent; discharging the EC effluent comprising magnetic particles through an effluent channel; and detecting an induced voltage in the EC effluent comprising magnetic particles.

In some aspects, the EC methods include adjusting EC reaction parameters based on the detected induced voltage. EC reaction parameters are selected from the group consisting of applied voltage or current, separation distance, solution temperature, mechanical stirring, and combinations thereof.

The EC method may further include providing a magnetic field in the effluent channel, and collecting magnetic particles.

In further aspects of the invention, an EC system is provided. The system includes a sensor for sensing induced voltage resulting from flow of an EC effluent comprising magnetic particles through an effluent channel in an EC apparatus, and a controller for adjusting EC reaction parameters in an EC chamber. EC reaction parameters are selected from the group consisting of applied voltage or current, separation distance, solution temperature, mechanical stirring, and combinations thereof.

Other features and advantages of the present invention will become apparent to those skilled in the art upon examination of the following or upon learning by practice of the invention.

DETAILED DESCRIPTION OF THE INVENTION

Figure 1:
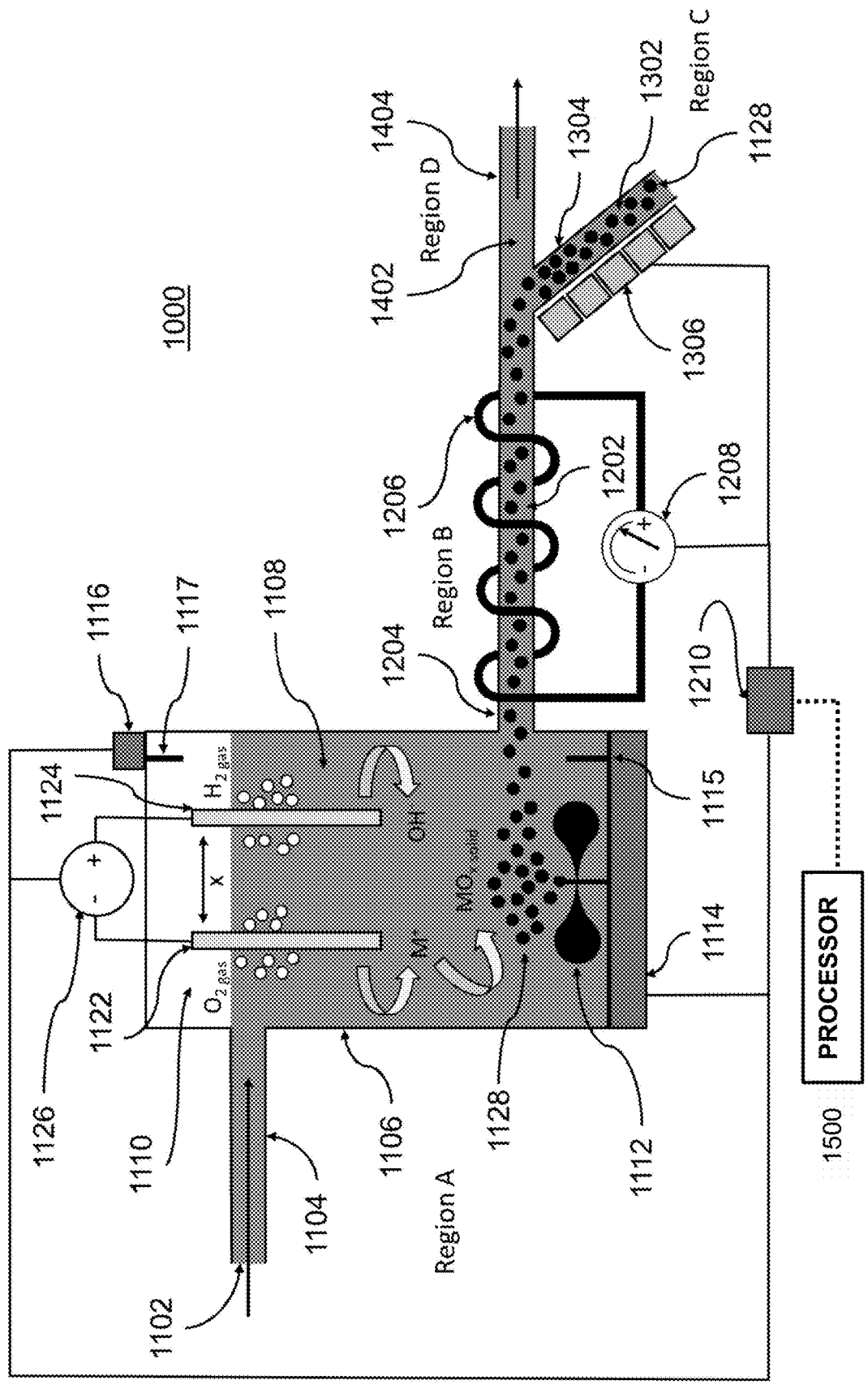
FIG. 1 is a schematic diagram depicting four discrete regions of an EC water treatment apparatus of the invention.

Treatment of oil-in-water emulsions is a pervasive and challenging issue, particularly for the naval wastewater treatment community.

The invention described herein, including the various aspects and/or embodiments thereof, meets the unmet needs of the art, as well as others, by providing apparatus, systems, and methods for treating oil-in-water emulsions by in situ production of magnetic $FeO_x$ nanoparticles. The EC-based treatment apparatus, systems, and methods of the invention are based on the production of metal cations in a wastewater solution.

The invention optimizes the treatment of waste streams with variable influent compositions and concentrations, which are typically comprised of emulsions and other small, stable particulates. The small, stable particulates may vary in composition, but typically carry an electrostatic charge on their surfaces, and have a size that is smaller than about 10 microns. Such particulates do not readily settle out of suspension because they are stabilized in suspension, where increasing strength of electrostatic charge correlates to increased stability in suspension in water. The particulates may be hydrophobic or hydrophilic.

Advantages of utilizing the EC-based wastewater treatment apparatus, systems, and methods of the invention include: (1) Improved ability to monitor and optimize the electrolysis process responsible for forming metal cations, enabling electrocoagulation to occur. Without continuous monitoring, the electrocoagulation process may become inefficient or ineffective. (2) Removal of magnetic particulates from the effluent flow prevents fouling or clogging of downstream wastewater treatment steps, particularly mechanical filtration apparatus. Use of a magnetic field dramatically accelerates the separation of magnetic nanoparticles from solution. (3) Possible prolonged acceptable EC treatment performance in the event collected magnetic particulates are able to be recycled into Region A for additional contaminant removal, improving processing performance thus reducing system energy requirements.

Apparatus

The apparatus of the invention improve upon existing EC equipment and techniques by monitoring effluent magnetic byproducts, such as oxides and hydroxides of the electrode metal used. The electrodes of the invention preferably comprise iron (Fe), although other electrode materials capable of producing magnetic byproducts may be used, for example, nickel (Ni), cobalt (Co), and alloys of iron (e.g., steel). In some aspects of the invention, the electrodes primarily comprise iron, for example at least 75% Fe, preferably at least 85% Fe, more preferably at least 90% Fe, and most preferably at least 95% Fe.

The apparatus of the invention beneficially uses the results of magnetic byproduct monitoring to adjust EC operating parameters, which in turn influence the properties of produced magnetic byproducts. During EC, a sacrificial anode is used in the production of metal cations, and if Fe or another ferromagnetic material is used, excess metal cations (i.e., cations not consumed in reactions with contaminants) can lead to the formation of magnetic oxide nanoparticles. By utilizing the magnetic properties of these nanoparticles to induce an electromotive force on a nearby conductor, the resulting voltage can be monitored to assess changes in the magnetic nanoparticle content of the effluent stream, which can in turn be used to optimize the EC process. For example, adjusting the applied anodic current based on the monitored voltage could improve the efficiency of the wastewater treatment process.

The EC apparatus of the invention preferably includes an influent channel for receiving an oil in water emulsion; an EC chamber that includes: a holding tank for the oil in water emulsion; at least two electrodes comprising Fe provided at a separation distance; a source of applied voltage and/or current in communication with the electrodes; an effluent channel for discharging an EC effluent comprising magnetic particles; and a sensor for sensing induced voltage resulting from flow of EC effluent comprising magnetic particles through effluent channel.

The EC apparatus of the invention may also include a controller for adjusting EC reaction parameters in the EC chamber. EC reaction parameters that can be controlled using the controller are selected from the group consisting of applied voltage and/or current, electrode separation distance, solution temperature, mechanical stirring, and combinations thereof. When equipped with the controller, the apparatus of the invention may be incorporated into a system for carrying out EC in wastewater.

The EC apparatus of the invention may further include a magnetic field provided proximate to, adjacent to, or directly within the effluent channel.

The features of the apparatus of the invention are described in greater detail with respect to FIG. 1.

In Region A of apparatus 1000, a wastewater influent 1102 flows through a conduit 1104 into a reaction chamber 1106. The wastewater may contain one or more contaminants to be removed, and may be saltwater, freshwater, or other aqueous solutions including dissolved ions. The contaminants include, but are not limited to oil (which may be in the form of oil-in-water emulsions, settled heavy oils, and surface films of oil), cleaning wastes (such as various surfactants and chemicals), as well as various organic and inorganic wastes.

The reaction chamber 1106 is not limited to any particular configuration, and it may include an apparatus 1112 for stirring or mixing the wastewater 1108 being treated in reaction chamber 1106. The reaction chamber 1106 may also include apparatus for adjusting the temperature 1114 of the wastewater 1108 being treated. Apparatus 1116 for adjusting the atmosphere in headspace 1110 above the wastewater 1108 held in the reaction chamber 1106 may also be provided. The atmosphere may be adjusted, for example, by venting headspace gases into the environment.

One or more sensors 1115 may be provided in the reaction chamber 1106 to monitor conditions in the wastewater 1108 as it is being treated, such as pH, temperature, and ion concentrations. One or more sensors 1117 may be provided in the headspace 1110 to monitor the relative concentrations of gases, such as $O_2$ and $H_2$, which are generated by the EC reactions.

Within the reaction chamber 1106 are two electrodes 1122, 1124 separated by a distance that can vary according to the size of the reaction chamber and the desired rate of generation of metal cations. In some aspects of the invention, the electrodes are separated by a distance X of from about 0.5 cm to about 10 cm, preferably from about 1 cm to about 5 cm, and more preferably from about 1 cm to about 3 cm, although the separation distance may vary depending on the dimensions of the reaction chamber and quantity of wastewater 1108 being treated. The electrodes 1122, 1124 may be energized by an external source of voltage 1126. With sufficient voltage, current will flow in a circuit between the two electrodes 1122, 1124, with charge neutrality maintained by ion flow within wastewater 1108. An external source of current may also be provided by 1126.

If no other reactants are present, water electrolysis will occur, resulting in the evolution of hydrogen gas and the formation of hydroxyl ions at the cathode 1124

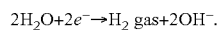
$$2H_2O+2e^- \rightarrow H_2 \text{ gas}+2OH^-.$$

Formation of oxygen gas may be observed at the anode 1122, due to consumption of the hydroxyl groups formed at the cathode 1124

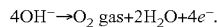
$$4OH^- \rightarrow O_2 \text{ gas}+2H_2O+4e^-.$$

If an anode material capable of undergoing electrochemical oxidation is used, generically expressed as a metal "M", then the anode reaction can result in the introduction of metal cations (M⁺) into the wastewater being treated 1108 as shown below,

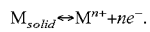
$$M_{solid} \leftrightarrow M^{n+}+ne^-.$$

Some fraction of these metal cations M⁺ will contribute to the electrocoagulation process by destabilizing oil-in-water emulsions, leading to the formation of contaminant flocs. These could be skimmed from the reaction tank 1106 shown in Region A of FIG. 1, or continue through with the effluent flow 1202 for subsequent removal.

Metal cations, which participate in follow-on chemical reactions, can result in the precipitation of insoluble metal oxides, metal hydroxides, and other phases including the metal cation M⁺, generically shown in FIG. 1 as $MO_x$ 1128. For reaction systems utilizing an iron-containing anode, this process results in the precipitation of magnetic iron oxide nanoparticles (i.e., $Fe_2O_3$ and $Fe_3O_4$), which can respond to an external magnetic field.

The orientation, size, and position of the electrodes 1122, 1124 within the reaction chamber 1106 shown in FIG. 1 represent only one possible configuration for the EC apparatus of the invention. The source of voltage and/or current 1126 may provide DC or AC voltage. In some aspects of the invention, the application of alternating current voltage may be preferred in the event that both anode and cathode are made of the same material (e.g., Fe metal), such that both anode and cathode are consumed at a similar rate to produce metal cations.

After EC, wastewater effluent 1202 containing contaminant flocculants, metal cations, and precipitated metal oxides 1128 flows from the reaction chamber 1106 in Region A into Region B through conduit 1204, permitting the magnetic field generated by the magnetic metal oxides to be detected.

Region B of apparatus 1000 may include a coil of conducting material 1206 wrapped around effluent conduit 1204, such that the motion of magnetic particulates (e.g., $Fe_2O_3$ and $Fe_3O_4$ nanoparticles) in effluent 1202 can be detected using a detector 1208 that senses an induced voltage in the conductor coil 1206. The magnitude of the magnetically-induced response in coil 1206 will be proportional to the mass fraction of magnetic particles in effluent 1202. Under idealized conditions, this mass fraction should be directly proportional to the current flow in the electrodes 1122, 1124 from Region A. However, the consumption of some of the metal cations by the EC process may be reflected by a deviation in the expected mass fraction.

By coupling the induced magnetic response detected at 1206, 1208 to the electrolysis process occurring at the electrodes 1122, 1124 in Region A via a controller 1210 (for example, a parallel input/output (PIO) controller), the EC process can be optimized to minimize energy consumption and/or to dynamically adjust reaction parameters in response to changing influent compositions. Reaction parameters known to influence the electrolysis reaction include, but are not limited to, the applied voltage or current, electrode separation distance (i.e., distance X in Region A of FIG. 1), solution temperature (preferably between 20° C. and 50° C., more preferably between 25° C. and 45° C.), use of mechanical solution mixing, and combinations thereof. The controller 1210 may interface with any or all of the apparatus for controlling headspace atmosphere 1116, headspace atmosphere sensors 1117, voltage source 1126, reaction chamber stirring apparatus 1112, reaction chamber heating apparatus 1114, reaction chamber sensors 1115, and magnetic field detector 1208. The controller 1210 may provide instructions to these and other apparatus and sensors for modulating EC reaction conditions.

Without wishing to be bound by theory, it is believed that there is a particular temperature set point or temperature range that optimizes treatment for a particular waste stream. When the EC apparatus of the invention is operated at that optimized temperature, the EC treatment process is not significantly influenced by other parameters, only the temperature of the influent solution. Operating the apparatus

1000 at such a temperature, or within such a temperature range, reduces the number of variables to be controlled. In some aspects of the invention, the EC treatment process is conducted at a temperature of from about 40° C. to about 50° C., preferably about 45° C., in order to minimize the impact of variables such as electrode separation distance and wastewater composition.

The controller 1210 is preferably a digital controller, and may operate as a standalone controller, or it may interface with a computer 1500. Computer 1500 incorporates a processor that executes a program, which may be stored in memory (e.g., RAM). The processor runs the program for monitoring and controlling EC reaction parameters in the apparatus of the invention, and optionally displays them for a user. The user display is not particularly limited, and may be a monitor provided as part of the computer, or a separate handheld device that receives data transmitted by the computer. Data regarding the EC reaction may be provided to the user as graph, table, or text output.

Alternative sensors for detecting an induced voltage are also envisioned in accordance with the invention. For example, an applied magnetic field could be used in place of a passive coil of conducting material, and the resulting response of the suspended magnetic nanoparticles could be detected. Alternatively, the magnetic field generated by the magnetic nanoparticles may be directly measured using an instrument such as a Gauss meter or magnetometer.

Regardless of the particular magnetic nanoparticle detection system used in Region B, the effluent 1202 flows unimpeded through Region B, until its flow is split into Region C and Region D.

In Region C of apparatus 1000, the magnetic particles 1128 are removed from the effluent 1202 (plausibly along with some amount of contaminant species) by an applied magnetic field 1306. The magnetic field may be generated by a series of permanent magnets that may be in direct contact with the magnetic effluent conduit 1304, although the magnet may also be provided near or proximate to the conduit 1304, so long as they generate a magnetic field strength sufficient to attract effluent 1302 containing a majority of the magnetic particles 1128 produced during the EC reaction. In some aspects of the invention, at least 90% of the magnetic particles are captured by the magnetic field, preferably at least 95% of the magnetic particles, more preferably at least 98% of the magnetic particles, and most preferably at least 99% of the magnetic particles are captured and removed from the effluent 1302. Electromagnets operated in a continuous or pulsed fashion could also be used to create a magnetic field. The presence of the magnetic field 1306 in Region C accelerates the settling of the magnetic particulates 1128 for accelerated removal from the wastewater effluent stream 1202. In some aspects of the invention, the magnetic field strength acting upon the magnetic particulates is from 3 kOe to 30 kOe, preferably from 5 kOe to 25 kOe, more preferably from 10 kOe to 20 kOe. In some presently-preferred aspects of the invention, the magnetic field strength is about 15-20 kOe.

The remaining effluent flow 1402, from which most magnetic particles have been removed, continues to Region D of apparatus 1000, which contains wastewater treated by the EC apparatus of the invention, with the majority of the magnetic byproduct phase removed. Effluent 1402 may also contain some remaining contaminants or floes that can be removed by a subsequent mechanical or chemical treatment process. Alternatively, effluent 1402 may be ready to be discharged, depending on the applicable effluent quality criterion.

Oil-in-saltwater emulsions produced to simulate contaminated bilge water have been successfully treated using apparatus of the invention equipped with iron electrodes. Turbidity measurements of as-prepared emulsions before and after treatment show a reduction in turbidity of over 98%. Application of magnetic field to the effluent was found to be effective in reducing the settling time for the iron oxide-containing sludge. In some aspects of the invention, the application of the magnetic field reduces the required settling time from several hours (e.g., more than one hour) to a few minutes (e.g., approximately 10 minutes or less).

Methods.

The invention additionally provides methods for treating oil-in-water emulsions found in wastewater, particularly oil-in-seawater emulsions.

The invention also relates to EC-based wastewater treatment methods, and more particularly to EC-based bilgewater treatment methods. In the methods, an influent is provided that comprises an oil-in-water emulsion. EC is performed on the influent using at least two electrodes comprising Fe or other ferromagnetic material, where the at least two electrodes are in communication, optionally with a source of applied voltage or current. An EC effluent comprising magnetic particles is generated, and is discharged through an effluent channel. The magnetic particles are detected by observing an induced voltage generated by the EC effluent comprising magnetic particles as it flows through the effluent channel. Alternatively, the magnetic field from the magnetic particles may be directly detected.

In some aspects of the invention, the EC methods include adjusting EC reaction parameters based on the detected induced voltage. EC reaction parameters are selected from the group consisting of applied voltage and/or current, electrode separation distance, solution temperature, mechanical stirring, and combinations thereof.

The EC method may further include providing a magnetic field in the effluent channel, and collecting magnetic particles.

Figure 2:
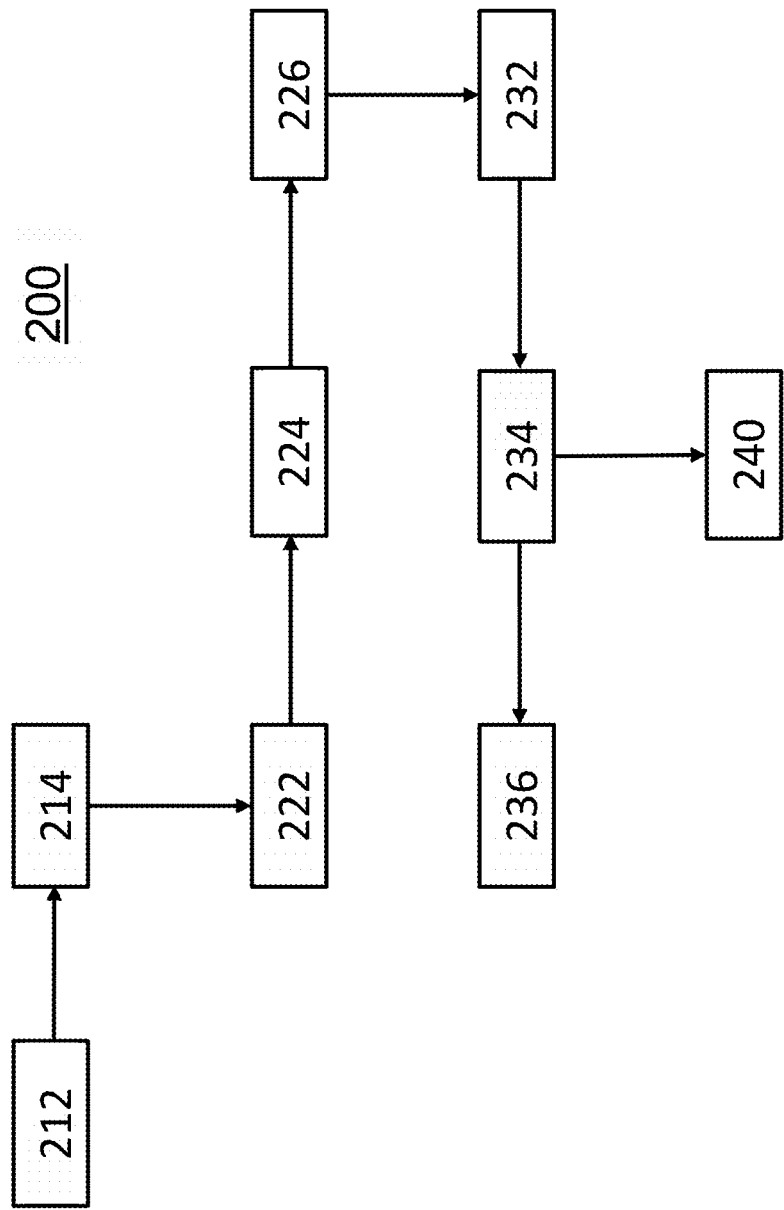
FIG. 2 is a flow chart depicting an EC water treatment method.

The EC methods of the invention are described in greater detail with respect to the flowchart presented in FIG. 2.

The method 200 includes the step of providing an influent flow of wastewater to be treated (Step 212). The influent wastewater is then treated using EC (Step 214), which is carried out in a reaction chamber having two iron-containing electrodes. The reaction chamber may also be equipped with a source of voltage or current to the electrodes, a controller for adjusting an environment in a headspace above the reaction chamber, a mechanical stirring apparatus, and a temperature control apparatus for adjusting the temperature of the influent in the reaction chamber. In some aspects of the invention, these steps may be carried out in Region A of the apparatus 1000, as depicted in FIG. 1.

As the influent wastewater is treated in the EC reaction chamber, it flows out of the reaction chamber and is discharged as an effluent that comprises magnetic nanoparticles (Step 222). As the effluent comprising magnetic nanoparticles flows within a discharge stream or effluent tube, a magnetic field and/or an induced voltage is generated. The magnetic field and/or induced voltage is detected and measured (Step 224), which may be accomplished, for example, by measuring a voltage drop across a coil of a conducting material that is provided around the effluent tube. Alternatively, the magnetic field generated by the magnetic nanoparticles may be directly measured using an instrument such as a Gauss meter or magnetometer. In some aspects of the invention, these steps may be carried out in Region B of the apparatus 1000 depicted in FIG. 1.

Depending on the detected magnetic field and/or induced voltage, EC reaction parameters such as may be adjusted (Step 226). The adjustment may be conducted manually, automatically by a controller, or it may be carried out by transmitting information regarding fluctuations in magnetic field and/or induced voltage to a processor that is programmed to adjust reaction parameters. Reaction parameters known to influence the electrolysis reaction include, but are not limited to, the applied voltage or current, electrode separation distance (i.e., distance X in Region A of FIG. 1), solution temperature, mechanical stirring, and combinations thereof. Controlling solution temperature is preferred (for example, from about 40° C. to about 50° C., preferably about 45° C.), as it reduces the impact of other variables on the resulting EC treatment process.

However, it should be understood that the reaction parameters may be adjusted based on the particular goal to be accomplished by the EC reaction. For example, if the EC reaction is to be carried out to provide an effluent stream having a high level of oil-in-water emulsion removed (e.g., 95% or greater, 97% or greater, 99% or greater), then the reaction conditions should be adjusted to minimize excess production of $M^+$ (for example, by increasing the distance between the electrodes and decreasing temperature). However, if the EC reaction is more concerned with generation of magnetic nanoparticles than the quality of the effluent stream, then the reaction conditions should be adjusted to produce high levels of $M^+$ (for example, by decreasing the distance between the electrodes and increasing temperature).

Additional steps may optionally be included within the methods of the invention. For example, a magnetic field may be applied to the effluent stream (Step 232), and the magnetic particles may be separated from the effluent (Step 234). In some aspects of the invention, these steps may be carried out in Region C of the apparatus 1000 depicted in FIG. 1.

Further optional steps of treating the EC effluent after the magnetic particles have been removed may also be included in the methods of the invention (Step 236). For example, chemical or mechanical separation techniques may be used to produce an effluent that meets particular water quality standards. In some aspects of the invention, these steps may be carried out in Region D of the apparatus depicted in FIG. 1.

Once the treatment methods of the invention have been carried out on the wastewater such that it meets applicable standards, it may be suitable for discharge. For example, in the case of bilgewater within a naval vessel, the bilgewater may be pumped out once the treatment is completed. If the treated wastewater does not meet applicable discharge standards, it may be transferred to a holding tank for further treatment when the naval vessel reaches port.

In addition to treating wastewater, the apparatus of the invention can be used for flow measurement within an EC system. The induced voltage created by the nanoparticles can be related to flow rate as an alternate method of flow measurement.

In some aspects of the invention, the recovered magnetic particles may be used without further processing. Where magnetic particles are a desired end product of the EC reaction, the magnetic particles may optionally be cleaned and dried for future use (Step 240).

The methods of the invention can also be used for the production of iron oxide nanoparticles (e.g., maghemite ($\gamma$-$Fe_2O_3$) and/or magnetite ($Fe_3O_4$) particles). The iron oxide nanoparticles may have diameters ranging from about 1 nm to about 100 nm, preferably from about 10 nm to about 50 nm. These nanoparticles may find use, for example, in medical, biological, chemical, and other applications.

In additional aspects of the invention, the $FeO_x$ nanoparticles may be recycled to form iron electrodes for use in the EC reaction chamber in Region A.

Systems

The invention also provides EC systems, and systems for monitoring and controlling an EC apparatus and/or method.

The systems include a sensor for sensing an induced voltage resulting from flow of an EC effluent comprising magnetic particles through an effluent channel, and/or a sensor for detecting the magnetic field created by the magnetic particles as they flow through an effluent channel.

The systems further include a controller (such as controller 1210 in FIG. 1) for adjusting EC reaction parameters in an EC chamber based on the detected level of magnetic particles, optionally in combination with other information received from additional sensors (such as sensors 1115, 1117 in FIG. 1) provided in an EC reaction chamber. The systems may be equipped with sensors provided in an EC reaction chamber that include, but are not limited to, temperature sensors, pH sensors, and influent flow rate sensors within the reaction chamber.

The controller may adjust various components of the EC apparatus to optimize the flow of magnetic particles through the effluent channel based on parameters input by an operator using an optional user input (including, but not limited to, desired magnetic particle output rate, and desired level of removal of oil-in-water emulsions from wastewater). This may occur, for example, by varying the applied voltage or current, adjusting the separation distance of the electrodes, adjusting the solution temperature, increasing or decreasing the rate of mechanical stirring, and combinations thereof.

The controller may operate the various components of an EC apparatus. The controller may optionally be linked to a processor that executes programming for adjusting the operating conditions in the EC apparatus in order to achieve a targeted flow rate for treated wastewater, magnetic particles, or both. The processor may be included in a computer that includes stored programming for implementing EC treatment methods, such as the methods set forth in FIG. 2 and described above.

The primary parameters to be adjusted using the controller include temperature, and voltage and/or current. Adjustments to temperature may be made, for example, to optimize treatment based on the composition of the waste stream. Adjustments to voltage and/or current may be made, for example, in response to pH measurements, magnetic field measurements, and/or induced current measurements from the flow of magnetic nanoparticles through a magnetic field.

EXAMPLES

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to explain the principles of the invention and its practical applications, to thereby enable others skilled in the art to utilize the invention and various embodiments with various modifications as are suited to the particular use contemplated.

Example 1. Methods and Materials

Electrocoagulation (EC) was evaluated as a route for the pre-treatment of oil-in-water emulsions using surrogate seawater concentrations (0.5 M NaCl), an oil simulant Navy Standard Bilge Mix #4, and a mixture of non-ionic (Triton X-100) and ionic (Sodium dodecyl sulfate) surfactants commonly found in Navy bilge water waste streams. The goal was to determine whether typical conditions for synthesizing magnetic Fe-oxide nanoparticles could be applied directly to an oily-bilge water simulant in an effort to simultaneously treat the wastewater stream by EC and to produce magnetic nanoparticles. The produced nanoparticles would be leveraged in the sludge removal process via a secondary magnetic filtration stage.

Oil-in-saltwater emulsions were prepared using a concentration of sodium chloride slightly below average seawater (0.5 M as compared to 0.6 M of average seawater) because dilution in the bilge is expected, along with 1000 ppm Navy Standard Bilge Mix #4 (NSBM4), and 100 ppm of total surfactant using Triton X-100 (TX-100) and Sodium dodecyl sulfate (SDS) in a 1:1 ratio. Control solutions were made which contained no surfactant or oil (0.5 M NaCl+DI water). Solution contents are described in Table 1, and referred to hereafter as "Solution A", "Solution B," and "Solution C", with all concentrations expressed as weight by volume (w/v). Solutions A and B are standard Navy wastewater simulants, with NSBM4 being a combination of shipboard oils described by military performance (MIL-PRF) standards containing 50 wt % marine diesel fuel (MIL-PRF-16884), 25 wt % 2190 TEP steam lube oil (MIL-PRF-17331) and 25 wt % 9250 diesel lube oil (MIL-PRF-9000). Solution C represents seawater.

TABLE 1

| Solution Name | Contents |
| --- | --- |
| Solution A | 0.5M NaCl, 100 ppm TX100:SDS |
| Solution B | 0.5M NaCl, 1000 ppm NSMB4, 100 ppm TX100:SDS |
| Solution C | 0.5M NaCl |

Figure 3:
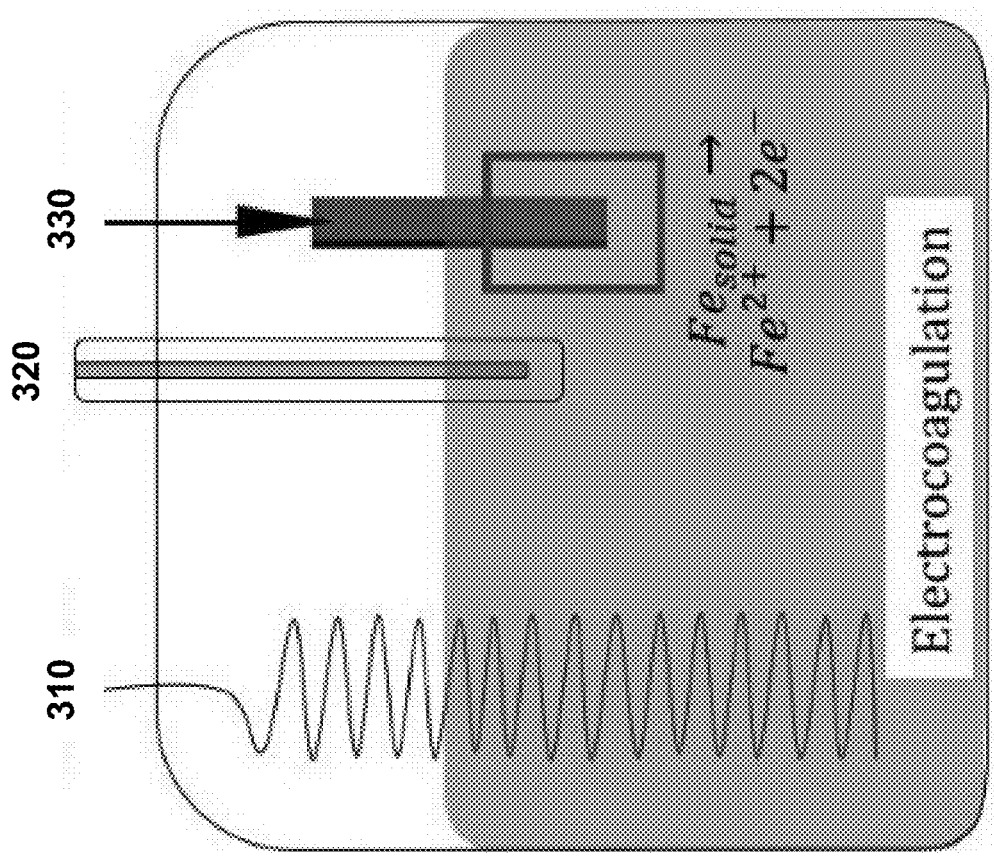
FIG. 3 depicts an electrocoagulation reaction using an iron working electrode, a platinum wire counter electrode, and a silver/silver nitrate reference electrode.

All solutions were prepared in 1 L batches using laboratory grade reagents and distilled water, and emulsified using an immersion homogenizer for a period of 30 seconds at approximately 20,000 rpm. Electrocoagulation experiments were conducted using the apparatus of FIG. 3 with coupons 330 of 99.5% Fe metal with active dimensions of 1 cm×1 cm×0.2 mm as working electrodes, a platinum wire counter electrode 310, and a silver/silver chloride (Ag/AgCl) in saturated KCl reference electrode 320. Each electrocoagulation experiment utilized 250 ml of prepared solution, which was emulsified immediately prior to use. All experiments were conducted at a fixed anodic current density of 200 mA/cm$^2$ (based on the initial area of the working electrode) and test duration of 30 min using a potentiostat/galvanostat (Gamry Reference 600™, Gamry Instruments, Warminster, PA). Solution temperature and distance between the working electrodes were varied at 25° C. or 45° C. and 1 cm or 3 cm, respectively, to evaluate the influence of electrochemical over potential on the anodization product phase and morphology. Solution temperature was maintained throughout the experiment using a temperature-controlled water bath.

Emulsions were characterized before and after electrocoagulation by measuring turbidity (Hach 2100Q Portable Turbidimeter, Hach Company, Loveland, CO) which was calibrated using standard solutions prior to use. Turbidity measured in Nephelometric Turbidity Units (NTU) was used as an indirect measurement of oil content in the simulated wastewater solution.

Following procedures described in Eaton, et al., aliquots of as-prepared and EC-treated solutions were gently mixed by inverting a 20 mL vial which had been thoroughly cleaned and de-greased using laboratory glassware soap, rinsed in distilled water, and dried with a lint-free laboratory tissue (A. Eaton, et al., Standard Methods for the Examination of Water and Wastewater, 19th ed., American Public Health Association, 1995, pp. 2.8-2.11). Sealed vials were degassed in an ultrasonic bath for 30 s to minimize air bubbles, and then wiped with a thin layer of silicone oil to minimize light scattering on the glass vial. Measurements were taken three times for each sample and averaged over multiple identical samples.

FeOx nanoparticles produced by the EC process can also influence turbidity, and for this reason turbidity measurements were collected both immediately after gentle mixing and after a period of 24 h of natural settling. To determine whether the FeO$_x$ particles introduced during the EC process could be readily manipulated by a magnetic field, a 0.47 T permanent magnet was placed under a sample vial containing the treated solution. After a period of 1 h, the supernatant was collected, remixed according to the above procedure, and used for the turbidity measurements. Natural settling of solutions containing FeOx precipitates was also observed after 1 h, and the turbidity of these solutions was collected as a comparison.

Following the electrocoagulation experiment, precipitates were extracted from the solution by vacuum filtration and 0.22 μm filter, rinsed several times with distilled water, and then dried at room temperature. Dried powders were collected and analyzed by scanning electron microscopy (SEM) and energy dispersive x-ray spectroscopy (EDS) to determine morphology and composition (Hitachi SU6600, Hitachi High-Tech, Tokyo, Japan, with Apollo 40 SDD, Edax Inc., Mahwah, NJ), x-ray diffraction (XRD) to determine the phase and crystallite size of any crystalline products (D8 Advance with LynxEye detector, Bruker ASX, Inc., Madison, WI), and by vibrating sample magnetometry (VSM) to determine magnetic properties and support phase assignments (Lake Shore Model 7410 VSM, Lake Shore Cryotronics, Inc., Westerville, OH). For SEM/EDS analysis, powders were dispersed in methanol and drop-coated onto a strip of Ni foil, and then sputter-coated with a thin layer of gold. XRD analysis of dried powders was conducted by sprinkling a small amount of powder onto a zero-diffraction plate (Si crystal). Magnetic properties were collected by filling polychlorotrifluoroethylene (PCTFE) containers with the dried powder. The mass of the powder was measured using a microbalance, and the diamagnetic background of the container was subtracted from the measurements.

Example 2. Electrocoagulation and Solution Characteristics

Figure 4A:
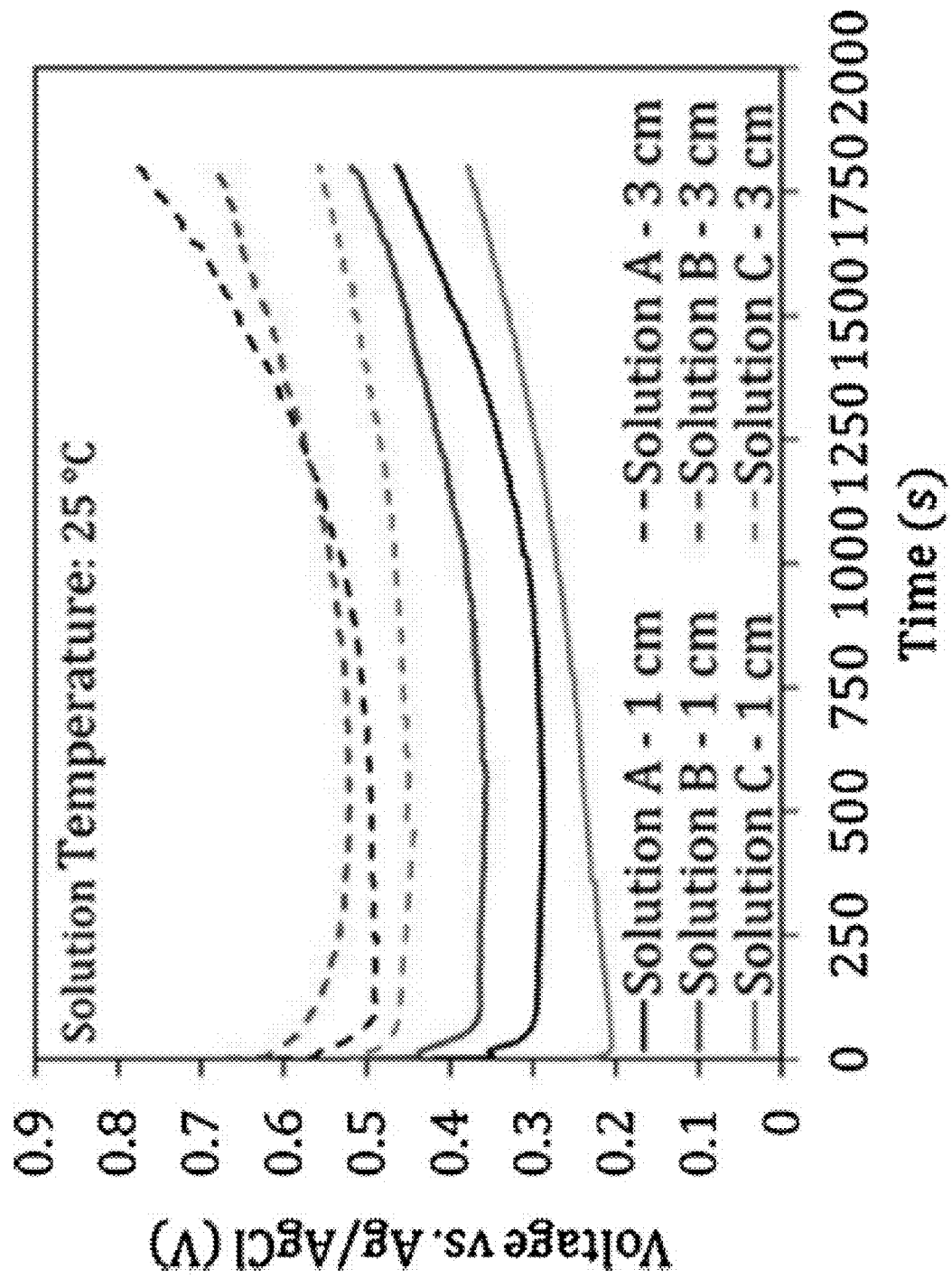
FIG. 4A is a graph depicting the working electrode potential measured against an Ag/AgCl reference electrode at 25° C. as a function of electrode separation and solution composition.

As-prepared emulsions had a cloudy and translucent appearance prior to treatment with electrocoagulation at a neutral pH (~7), as determined by a laboratory pH test strip. Application of 200 mA/cm$^2$ of anodic current resulted in an immediate formation of gas bubbles at the Pt counter electrode, while an orange foam was formed at the Fe working electrode, which eventually became a brown precipitate. Working electrode potential was monitored against an Ag/AgCl reference electrode and found to be sensitive to the distance between the counter electrode and working electrode, solution temperature, and solution composition. As shown in FIG. 4A, at a temperature of 25° C., the electrode separation and electrolyte solution have a large influence on the observed working electrode potential.

Larger electrode distances raised the observed working electrode potential, which was expected based on electrochemical kinetics. The presence of oil and surfactant were both observed to increase the necessary potential for Fe oxidation, with the pure saltwater solution (Solution C) having the lowest working electrode potential when evaluated at 25° C. It was unclear whether this is due to a passivation of the working electrode by adsorbed oil or surfactant molecules, or a more complex mechanism pertaining to the formation of Fe cations. For the tests conducted at 45° C. (see FIG. 4B), the working electrode potential was found to be relatively insensitive to electrode separation and electrolyte solution composition, presumably due to enhanced electrolyte conductivity and improved kinetics at the working electrode for the dissolution of Fe cations relative to the experiments conducted at 25° C.

Figure 4B:
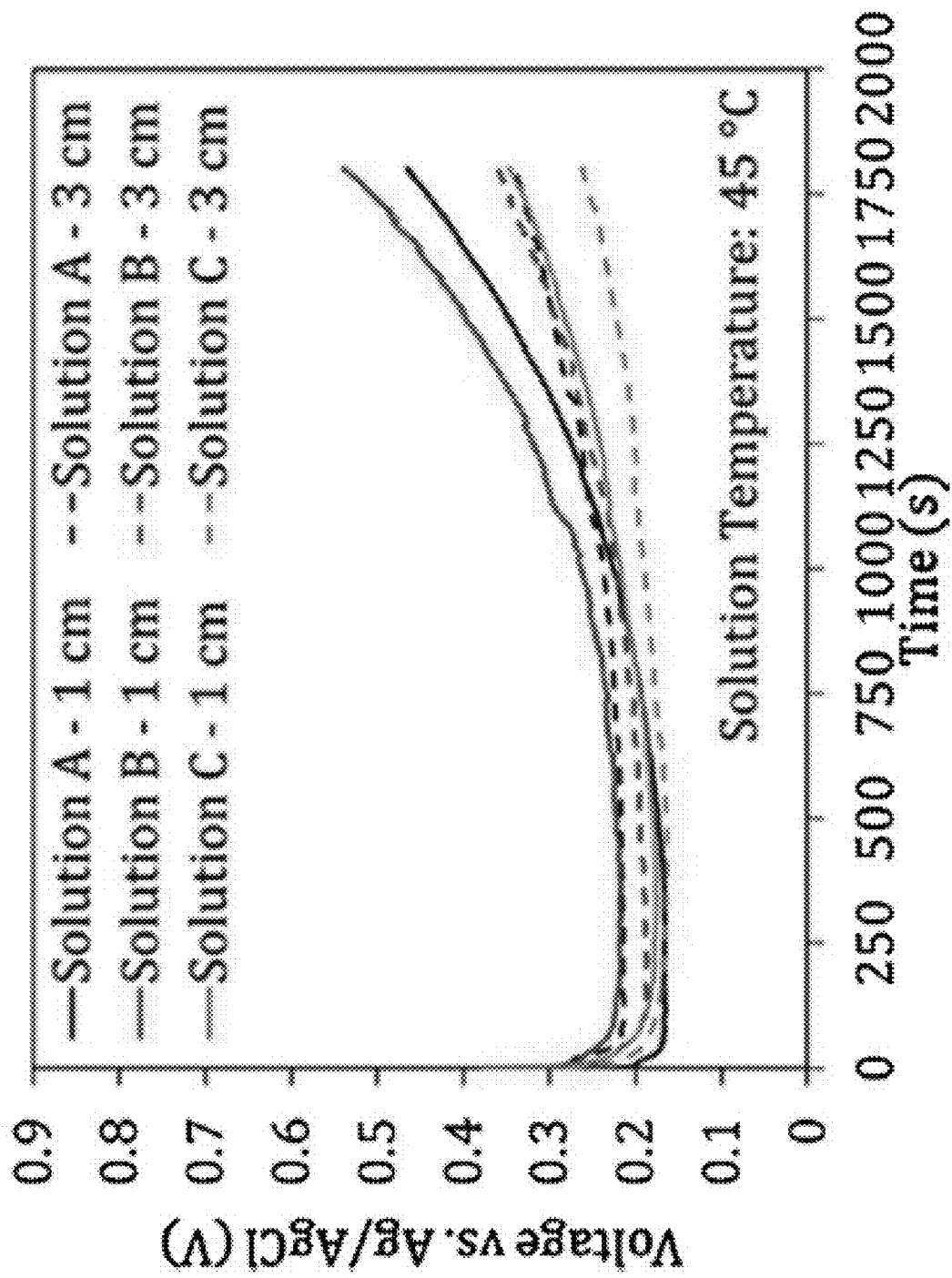
FIG. 4B is a graph depicting the working electrode potential measured against an Ag/AgCl electrode at 45° C. as a function of electrode separation and solution composition.

In the experimental conditions used (25° C. and 45° C. with very low concentrations of Fe species in the solution), the primary reaction occurring at the working electrode is assumed to be the oxidation of Fe metal to $Fe^{2+}$ cations, $$Fe_{solid} \leftrightarrow Fe^{2+} + 2e^- \quad \text{(Eq. 1)}$$

which has a standard electrode potential of −0.44 V vs. the standard hydrogen electrode (SHE) (−0.64 V vs. Ag/AgCl) (B. Beverskog et al., "Revised Pourbaix Diagrams from Iron at 25 to 300° C.," *Corros. Sci.* 38 (1996) 2121-2135). However, significant over potentials are observed as shown in FIGS. 4A-4B, and working electrode potentials of +0.2 V vs. Ag/AgCl and above are observed for every combination of electrolyte solution, temperature, and electrode separation. All experiments show an initial decrease in working electrode potential, which is attributed to the removal of a passivation layer on the Fe surface, followed by a steady increase in potential for the duration of the experiment. This steadily rising potential is likely due to the decreasing area of the Fe electrode, which increases the effective current density above the nominal 200 mA/cm2. In one case (solution A at 3 cm and 25° C.), the final working electrode potential is above the standard electrode potential for the formation of insoluble $Fe_2O_3$ (+0.72 V vs. Ag/AgCl), and involves a second electron-transfer reaction with $Fe^{2+}$ cations formed at lower potentials:

$$2Fe^{2+} + 3H_2O + Fe_2O_3{}_{solid} + 6H^+ + 2e^- \quad \text{(Eq. 2)}$$

At the conclusion of the electrocoagulation process, a large amount of brown precipitates was observed in the solution. Due to the gas formation at the counter electrode, these precipitates remained dispersed in solution for the duration of the experiment, but eventually settled out of solution afterward. When checked immediately following the anodization process, the solution pH was found to be slightly basic (PH ~10-11), which is consistent with the assumed reaction occurring at the counter electrode:

$$2H_2O + 2e^- \leftrightarrow H_2{}_{gas} + 2OH^- \quad \text{(Eq. 3)}$$

However, when measured again an hour after the experiment, the pH of the solution returned to neutral (pH ~7), indicating ensuing chemical reactions consumed the hydroxyl groups.

The initially released $Fe^{2+}$ cations eventually result in a product of $Fe_3O_4$ (magnetite) following chemical or electrochemical reactions, generally involving OH-produced at the cathode (see Eq. 3).

The formation of magnetite, which requires some $Fe^{3+}$ cations, implies an additional oxidation step following the initial electrochemical formation of $Fe^{2+}$. A direct electrochemical oxidation of $Fe^{2+}$ to $Fe^{3+}$ occurs at the anode, followed by a precipitation of $Fe(OH)_3$, which is in turn electrochemically reduced at the cathode to $Fe_3O_4$.

The iron working electrodes were found to be partially corroded away after the electrocoagulation process and mass loss across all cases was found to be an average of 104.4 mg. This is consistent with an assumed reaction of 2 e⁻ per mole of Fe consumed to form $Fe^{2+}$ cations, which provides a theoretical mass loss of 104.1 mg as shown in Faraday's law of electrolysis:

$$\text{Mass Loss (g)} = It\, Mw/nF \quad \text{(Eq. 4)}$$

wherein the electrode mass loss in grams can be related to the total charge consumed by Fe oxidation, current I multiplied by time t (0.2 A·1800s=360 C), n is the valence of the electrolysis product, $Fe^{2+}$ (n=2), Mw is the molecular weight of Fe metal (55.845 g/mol), and F is Faraday's constant (96,485 C/mol).

The electrode mass loss and energy per unit mass of electrode lost is shown in Table 2.

TABLE 2

| Electrolyte | Electrode Mass Loss (mg) | Energy/mass (Wh/g) |
|---|---|---|
| Solution A, 25° C., 1 cm | 104.3 | 317.2 |
| Solution A, 25° C., 3 cm | 104.6 | 535.9 |
| Solution A, 45° C., 1 cm | 105.0 | 235.1 |
| Solution A, 45° C., 3 cm | 104.2 | 239.6 |
| Solution B, 25° C., 1 cm | 104.9 | 381.1 |
| Solution B, 25° C., 3 cm | 104.9 | 541.1 |
| Solution B, 45° C., 1 cm | 104.0 | 283.3 |
| Solution B, 45° C., 3 cm | 104.3 | 274.5 |
| Solution C, 25° C., 1 cm | 104.6 | 260.8 |
| Solution C, 25° C., 3 cm | 104.5 | 457.6 |
| Solution C, 45° C., 1 cm | 104.0 | 218.0 |
| Solution C, 45° C., 3 cm | 104.5 | 185.6 |

The electrochemical oxidation of Fe is most efficient for a solution at 45° C., and slightly more efficient for shorter electrode separations. Energy was calculated based on the working electrode potential, and, while counter electrode potential was not directly measured, the over potential for $H_2$ evolution using a platinum electrode is expected to be approximately constant.

Example 3. Magnetic Separation of Treated Solutions

Figure 5:
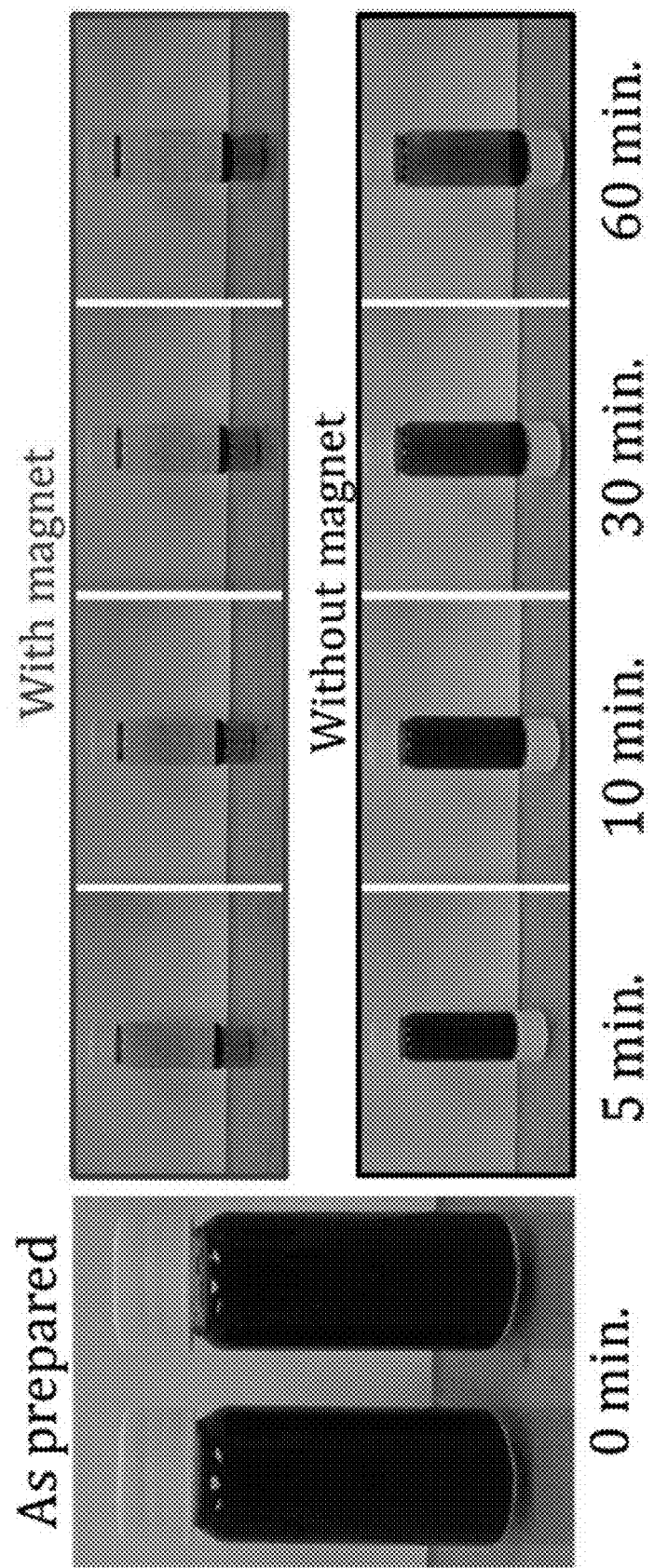
FIG. 5 depicts the response of post-electrocoagulation solution containing $FeO_x$ precipitates immediately after treatment and after settling for 60 min with and without a magnet. The wastewater was treated at 25° C. with a 1 cm electrode separation.

The precipitates formed during electrocoagulation were found to be highly responsive to a permanent magnet. Within a few seconds of placing a freshly treated sample of Solution B onto a 0.47 T magnet, the brown precipitate was rapidly drawn to the base of the sample vial. After a period of 60 min with no magnetic field, some fraction of the electrochemically produced FeOx precipitates remain dispersed in solution, however the magnetically separated solutions have noticeably improved clarity. As shown in FIG. 5, after only 5 min of settling under the influence of a permanent magnet, most of the visible suspended precipitates have been drawn out of solution. Conversely, under natural settling a large amount of precipitates remain suspended in solution after an hour.

Turbidity measurements were conducted on as-prepared Solution A, Solution B, Solution C, and distilled water without EC treatment or separation to determine baseline turbidity of the solutions, as shown in Table 3. Samples of Solution B treated by the electrocoagulation process were analyzed with and without magnetic separation.

TABLE 3

| Electrolyte | Magnetic Field | t = 0 hours (NTU ± 10%) | t = 24 hours (NTU ± 10%) |
|---|---|---|---|
| Distilled Water | N/A | 0.8 | 0.5 |
| Solution A | N/A | 6.1 | 1.9 |
| Solution B | N/A | 210.3 | 79.5 |
| Solution B, 25° C., 1 cm | With | 4.5 | 1.4 |
| | Without | 59.2 | 4.2 |
| Solution B, 25° C., 3 cm | With | 7.9 | 0.8 |
| | Without | 60.4 | 3.1 |
| Solution B, 45° C., 1 cm | With | 4.3 | 0.9 |
| | Without | 75.1 | 2.0 |
| Solution B, 45° C., 3 cm | With | 3.26 | 1.0 |
| | Without | 70.1 | 4.6 |

Immediately after gentle mixing, the untreated Solution B showed a turbidity value above 200 NTU, several orders of magnitude above distilled water or a Solution A containing only surfactants and salt. Samples of EC treated Solution B were found to have comparable turbidity values to Solution A but still slightly higher than distilled water or Solution C, which implies that some amount of observed turbidity was due to the formation of air bubbles stabilized by surfactant molecules that were not removed by sonication. In comparison to EC solutions subjected to a magnetic field, solutions treated by EC and only allowed to settle for 60 min had significantly higher turbidity values (FIG. 5).

After an additional 24 h of natural settling, all solutions were found to have a lower turbidity than the as-prepared solution. From the results shown in Table 3, it can be concluded that electrocoagulation using the described method is highly effective for reducing solution turbidity of the emulsified oil/surfactant solutions, and that the application of a magnetic field can significantly decrease the settling time required to observe reduced turbidity.

Example 4. Precipitate Morphology, Composition, and Crystallinity

SEM analysis of powders extracted from the EC-treated solutions showed consistent morphology regardless of solution temperature, electrode distance, or the presence of surfactant. All samples contained predominantly-spherical particles with diameters in the range of 50-100 nm (FIG. 6) with the smallest discernable particles having diameters closer to 20-30 nm, however significant agglomeration was observed, making determination of primary particle size by SEM difficult.

Samples produced at 25° C. and 1 cm electrode distance were found to be slightly smaller than at 3 cm electrode distance, regardless of the electrolyte solution used, while samples produced at 45° C. showed no clear dependence on electrode separation or electrolyte solution used, resulting in overlapping error bars for all conditions evaluated. In some regions, non-spherical crystallites were observed with needle or plate-like morphologies. No experimental conditions appeared to favor spherical over multi-faceted particles, and these features appeared for every experimental condition evaluated.

Figure 7:
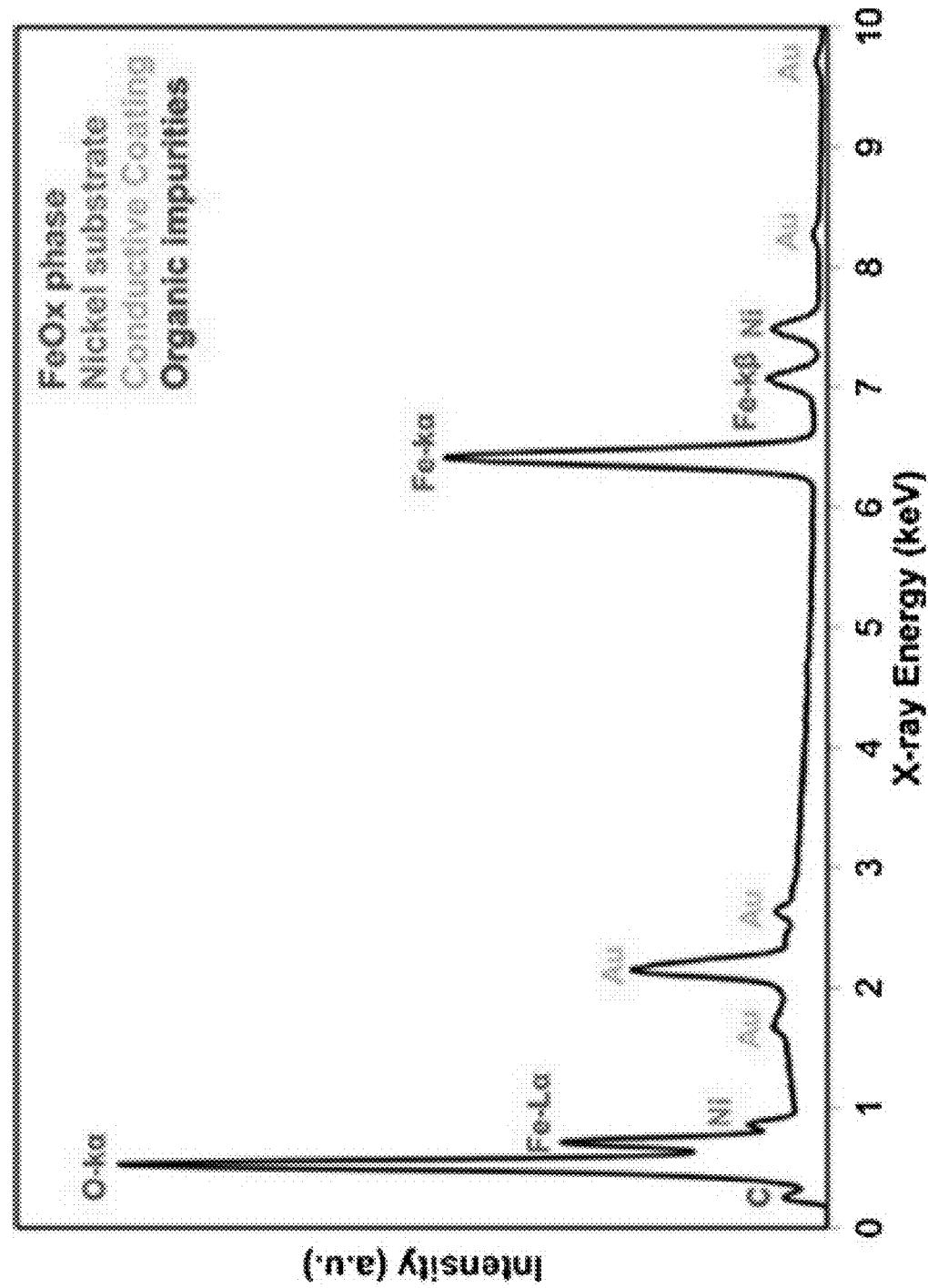
FIG. 7 is a representative EDS spectra for precipitates extracted from EC treated Solution B prepared at 25° C. with a 1 cm electrode distance.

Chemical analysis by EDS showed that no insoluble Na or Cl-containing compounds were formed during the EC experiment, and in addition to Fe and O, only the Ni substrate, Au conductive coating, and minor C contamination (possibly residual oil or surfactant) was observed, as shown in FIG. 7. Furthermore, the Fe:O atomic ratio as determined from the Fe-K$\alpha$ and O-K$\alpha$ x-ray peaks was between 0.58 and 0.72 for all experimental conditions (averaged between three regions in each sample), which indicates an average oxidation state of $Fe^{2.7+}$ to $Fe^{3.4+}$.

Electrode distance can play a role in the observed product phase when forming FeOx nanoparticles by the electrochemical oxidation of Fe working electrodes. Samples produced with a shorter electrode separation (i.e., 1 cm) are expected to have the greatest local pH variation due to the production of OH" at the counter electrode (see Eq. 3). Samples produced at 1 cm separation distance in all solutions were further analyzed by XRD and VSM to determine the influence, if any, production conditions have on the phase of FeOx.

Figure 6:
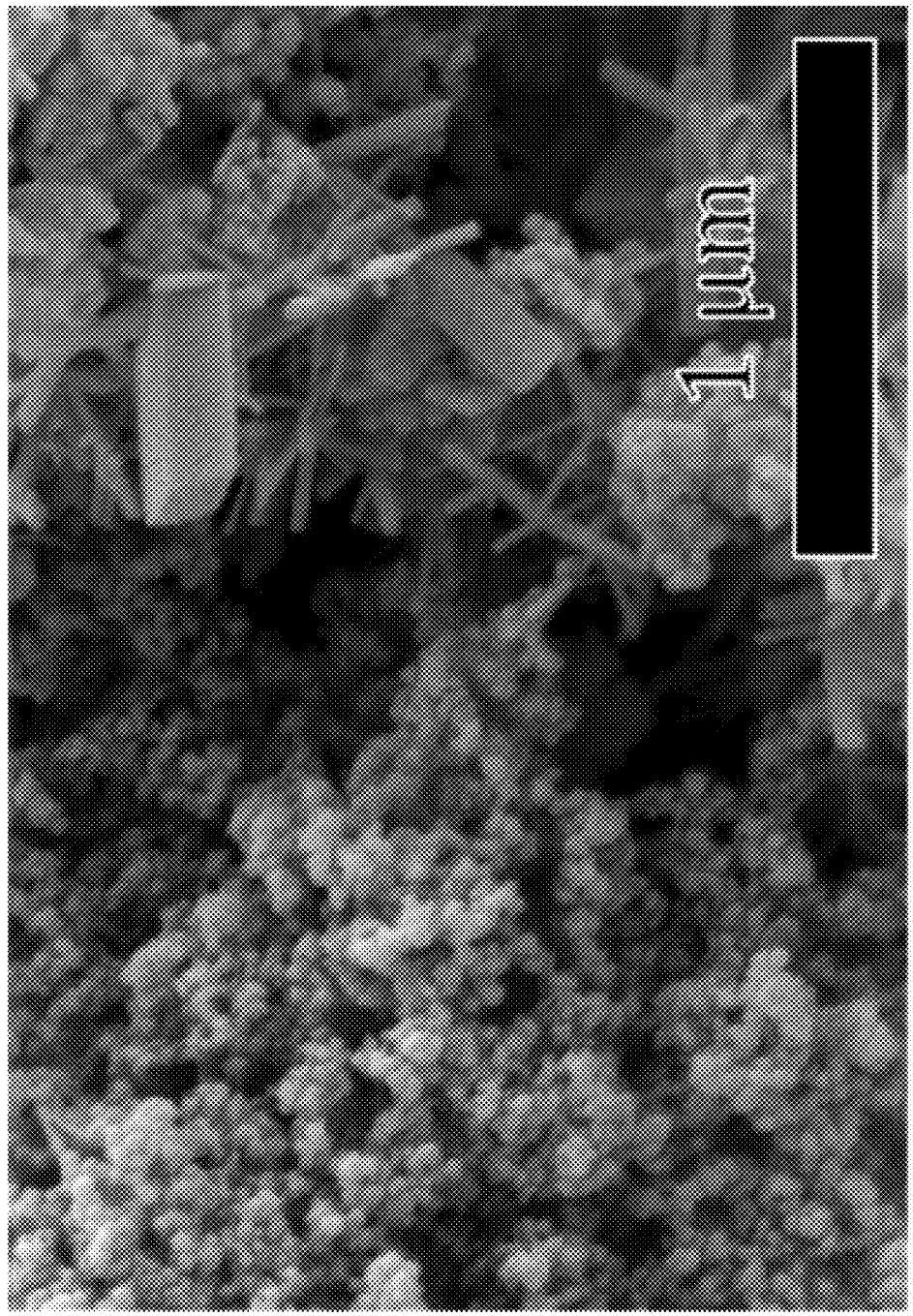
FIG. 6 is a representative scanning electron micrograph of precipitates extracted from EC treated solution B, prepared at 25° C. with a 1 cm electrode distance collected at 50k magnification.
Figure 8:
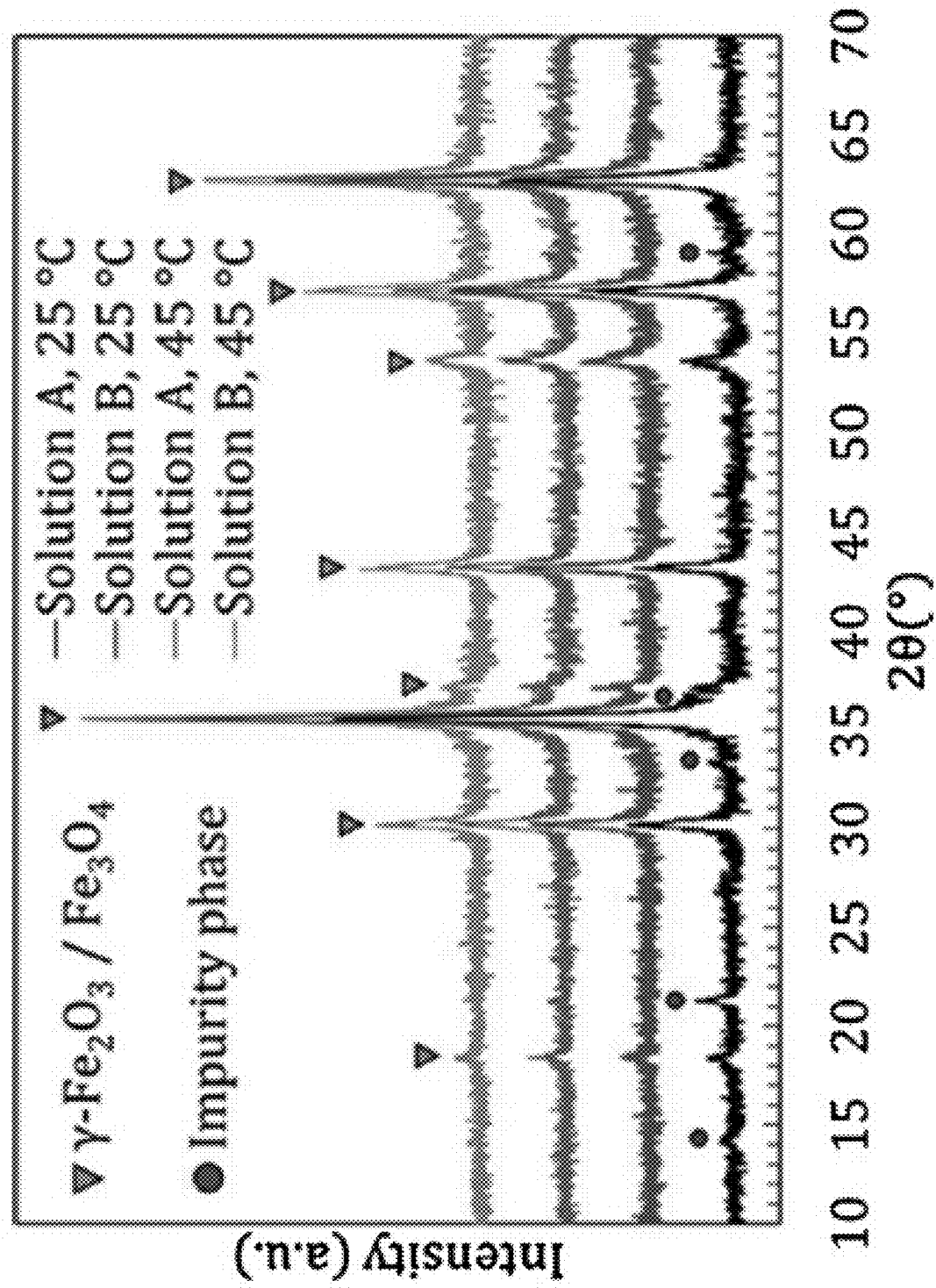
FIG. 8 depicts X-ray diffraction patterns (using Cu Kα radiation) for precipitates extracted from EC treated solutions (A and B) at 25° C. and 45° C. using a 1 cm electrode separation.

While the varying morphology shown in FIG. 6 indicates that more than one phase may exist in the as-prepared precipitates, all samples were found to contain one dominant crystalline component regardless of synthesis conditions, which can be assigned to both $Fe_3O_4$, magnetite, with an inverse spinel crystal structure, and $\gamma$-$Fe_2O_3$, maghemite, with a crystal structure deviating from $Fe_3O_4$ due to the presence of Fe vacancies (see FIG. 8).

Crystallite size, T, estimation was conducted using the Scherrer equation:

$$T = K\lambda/\beta\cos\theta \quad \text{(Eq. 5)}$$

where $\beta$, the full-width at half-maximum, values were measured for the most intense peak occurring at 35.5° 2$\theta$, $\lambda$ is the x-ray wavelength (0.154 nm for Cu-K$\alpha$ used here), and K is a dimensionless "shape factor", assumed here to be 0.94 for spherical crystallites with cubic symmetry. All samples had a crystallite size ranging from 22 nm to 24 nm. Eight diffraction peaks are discernable in the diffraction pattern for the as-prepared EC-FeO$_x$ in FIG. 8, and all of these peaks are present in the powder diffraction files for both $\gamma$-$Fe_2O_3$ and $Fe_3O_4$. Some uncertainty in XRD phase assignment can also be attributed to the Fe fluorescence x-ray signal produced by using a Cu x-ray source, which reduces the signal-to-noise ratio and makes distinction between $\gamma$-$Fe_2O_3$ and $Fe_3O_4$ quite difficult. For a sample produced with solution A at 25° C. and a 1 cm electrode distance, a few additional impurity peaks were observed in the XRD pattern, which are plausibly assigned to FeO(OH).

Example 5. Precipitate Magnetic Properties

Figure 9:
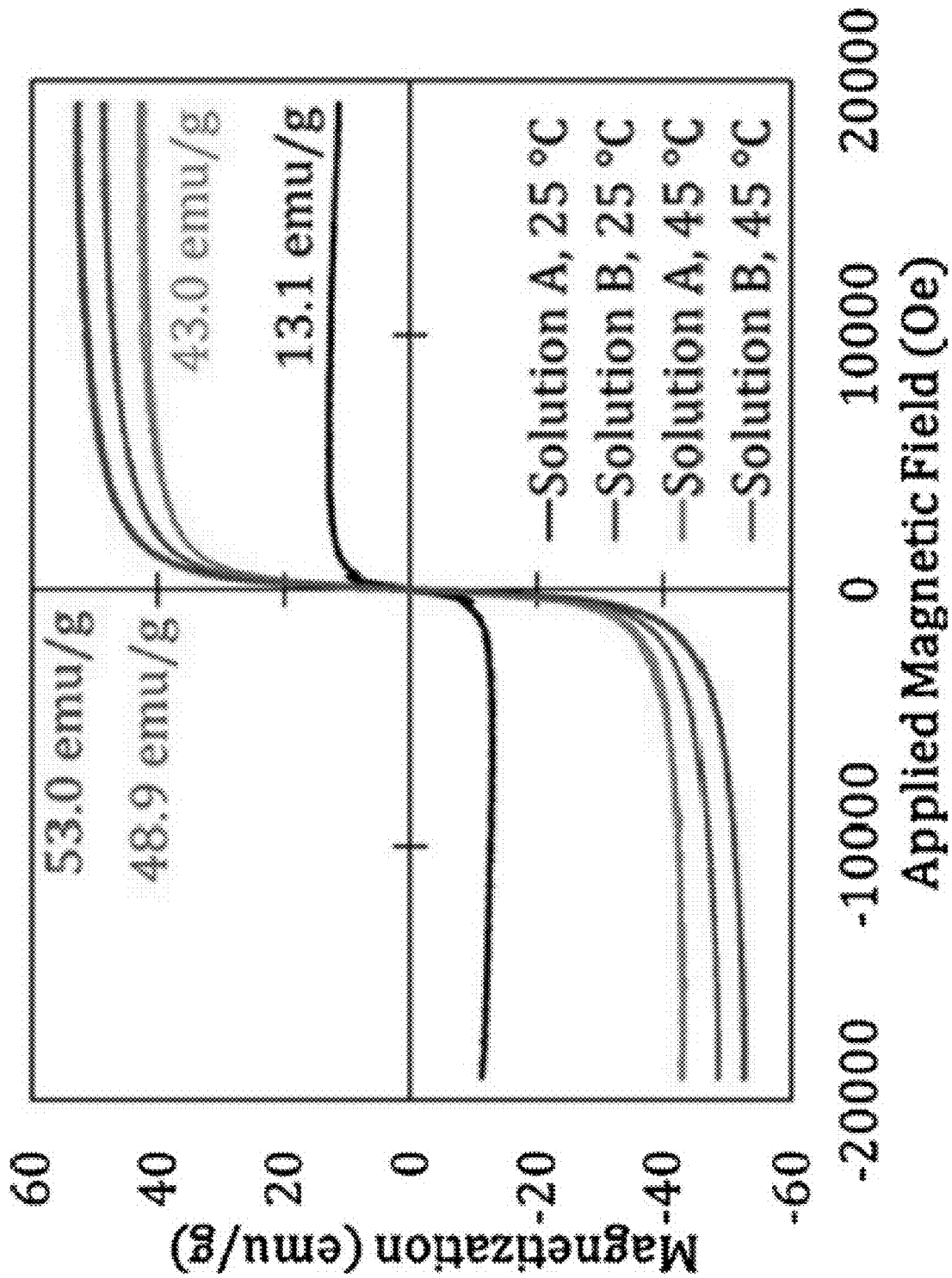
FIG. 9 depicts magnetization curves for precipitates extracted from EC treated solutions (A and B) synthesized at 25° C. and 45° C. using a 1 cm electrode separation.

Magnetization curves for FeO$_x$ nanoparticles produced in the presence of oil and surfactant are shown in FIG. 9.

For an electrode separation of 1 cm and solution B containing oil, surfactants, and salt, solution temperature was found to have a significant influence on the observed working electrode potential (FIGS. 4A and 4B). However, as with SEM, EDS, and XRD analysis, the magnetization properties of the extracted FeO$_x$ precipitates are virtually identical. Meanwhile for precipitates collected following FeO$_x$ formation at 25° C. and 1 cm electrode separation in Solution A, which contained no oil and showed signs of an impurity phase by XRD, the magnetization is much lower. Magnetization of precipitates produced at 1 cm and 45° C. in Solution A, which did not show the impurity phase in XRD, are closer to those observed for $FeO_x$ production in Solution B, but still lower in comparison.

While some variation in magnetic saturation was observed between samples, all precipitates were observed to have a ferromagnetic or superparamagnetic response to an applied field strength of 19,000 Oe. A saturation magnetization (M) of approximately 50 emu/g, and coercivities (H) of approximately 30 Oe, were observed for the precipitates produced in solution B. This is comparable to, but slightly lower than, the saturation and coercivity of commercially-available $Fe_3O_4$ nanoparticles (15-20 nm, Hc=30.98 Oe, Ms=60.45 emu/g) and $\gamma$-$Fe_2O_3$ nanoparticles (20 nm, Hc=38.21 Oe, Ms=56.89 emu/g) (US Research Nanomaterials, Inc., Houston, TX).

The electrochemical production of $Fe_3O_4$ nanoparticles typically yields magnetization values closer to 70 emu/g when very little (0.04 M) or no supporting electrolyte salt is used, and 50 emu/g when the supporting electrolyte salt concentration was 0.1 M. For all samples, the observed magnetic saturation per unit mass was lower than expected based on the XRD phase assignments. An amorphous or otherwise undetectable impurity phase with a low saturation magnetization may be present in all samples.

Example 6. Conclusion

Use of electrochemical treatment of an oil-in-saltwater emulsion by electrocoagulation with simultaneous production of $FeO_x$ nanoparticles was effective. The EC process reduced the turbidity of the emulsion by over 98%, while the magnetic properties of the in situ formed particles were utilized as a means to accelerate settling and remove sludge formed during EC. The presence of oil and significant quantities of salt (0.5 M) in the electrolyte had some influence on the observed working electrode potentials and resulting production efficiency, however these differences were minimized by raising the temperature of the electrolyte to 45° C. Solution temperature was found to be the most critical parameter for influencing the efficiency of the electrocoagulation process, while electrode separation and solution contents (i.e. the presence of surfactants and oil) had less of an influence, especially for a solution temperature of 45° C. Based on the materials characterization efforts, which reported an Fe oxidation of Fe to $Fe^{3,4+}$ and crystalline peaks attributable to FeO, $\gamma$-FeO, and FeO(OH), it is difficult to assign the electrochemical oxidation products to a single phase (i.e., $Fe_3O_4$).

Characterization of the Fe-oxide precipitates by electron microscopy, x-ray diffraction, and vibrating sample magnetometry confirmed that the products were nano-sized crystallites assignable to either $Fe_3O_4$ or $\gamma$-$Fe_2O_3$. All measurements indicated that a secondary phase was present, which appeared as a varied particle morphology, a weak diffraction peak in some samples, and a reduced magnetic saturation. These results indicate that further optimization of the electrocoagulation process may be possible, which could further improve the magnetic response of the Fe-oxide containing sludge.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. An electrocoagulation apparatus, comprising:
an electrocoagulation reaction chamber;
an influent channel, for conveying an influent into the electrocoagulation reaction chamber, wherein the influent includes an oil-in-saltwater emulsion;
at least two electrodes, at least one of the at least two electrodes including iron, wherein the at least two electrodes are separated from each other by a separation distance;
a power source, for applying voltage or current to at least one of the at least two electrodes, wherein an electrification of at least one of the at least two electrodes results in in situ electrochemical production of iron oxide cations in furtherance of an electrocoagulation reaction with respect to the influent, and wherein excess iron oxide cations form magnetic iron oxide nanoparticles, the magnetic iron oxide nanoparticles having respective diameters ranging from about 1 nm to about 100 nm;
an effluent channel, for conveying an electrocoagulation effluent out of the electrocoagulation reaction chamber, the electrocoagulation effluent including the magnetic iron oxide nanoparticles;
a magnetic field source proximate the effluent channel, wherein the magnetic field emanating from the magnetic field source has a magnetic field strength ranging from about 3 kOe to about 30 kOe, wherein the magnetic iron oxide nanoparticles in the electrocoagulation effluent are responsive to the magnetic field being applied by the magnetic field source to the electrocoagulation effluent;
a magnetic sensor, for sensing the magnetization of the magnetic iron oxide nanoparticles in the electrocoagulation effluent; and
a computer-controller having computer code characterized by computer program logic for regulating, on a continuous basis, the magnetization of the magnetic iron oxide nanoparticles in the electrocoagulation effluent, wherein the magnetization of the magnetic iron oxide nanoparticles is associated with the magnetic field strength of the applied magnetic field, and wherein the computer code is executable by the computer-controller so that, in accordance with the computer program logic, the computer-controller performs acts including:
monitoring the magnetization of the magnetic iron oxide nanoparticles in the electrocoagulation effluent, wherein the monitoring of the magnetization includes receiving sensory signals from the magnetic sensor;
modulating the magnetic field strength of the applied magnetic field, wherein the modulating includes determining, in a magnetization curve, when an increase in the magnetic field strength of the applied magnetic field does not further increase the magnetization of the magnetic iron oxide nanoparticles in the electrocoagulation effluent, the magnetic iron oxide nanoparticles thereby manifesting superparamagnetism whereby the magnetic iron oxide nanoparticles have been magnetized approximately to saturation magnetization, and wherein the modulating of the magnetic field strength further includes transmitting control signals to the magnetic field source.

2. The electrocoagulation apparatus of claim 1, further comprising a reaction chamber heating device, wherein the acts performed by the computer-controller in accordance with the computer program logic further include transmitting control signals to the reaction chamber heating device to effect an adjustment of the temperature in the reaction chamber.

3. The electrocoagulation apparatus of claim 1, wherein the acts performed by the computer-controller in accordance with the computer program logic further include transmitting control signals to the power source to effect an adjustment of the voltage or current applied by the power source.

4. The electrocoagulation apparatus of claim 2, wherein the temperature in the reaction chamber ranges from about 40° C. to about 50° C.

5. The electrocoagulation apparatus of claim 1 further comprising a reaction chamber stirring device, wherein the acts performed by the computer-controller in accordance with the computer program logic further include transmitting control signals to the reaction chamber stirring device to effect an adjustment of the rate of stirring in the reaction chamber.

6. The electrocoagulation apparatus of claim 1, wherein the acts performed by the computer-controller in accordance with the computer program logic further include transmitting control signals to effect an adjustment of the separation distance between the electrodes.

7. The electrocoagulation apparatus of claim 1, wherein:
the acts performed by the computer-controller in accordance with the computer program logic further include transmitting control signals pertaining to at least one electrocoagulation reaction parameter selected from the group consisting of the voltage or current applied by the power source, a temperature in the reaction chamber, and a rate of stirring in the reaction chamber;
if the electrocoagulation reaction parameter is the voltage or current applied by the power source, then control signals are transmitted to the power source to effect an adjustment of the voltage or current applied by the power source;
if the electrocoagulation reaction parameter is the temperature in the reaction chamber, then the electrocoagulation apparatus further comprises a reaction chamber heating device, wherein control signals are transmitted to the reaction chamber heating device to effect an adjustment of the temperature in the reaction chamber;
if the electrocoagulation reaction parameter is the rate of stirring in the reaction chamber, then the electrocoagulation apparatus further comprises a reaction chamber stirring device, wherein control signals are transmitted to the reaction chamber stirring device to effect an adjustment of the rate of stirring in the reaction chamber.

8. The electrocoagulation apparatus of claim 1, wherein:
the acts performed by the computer-controller in accordance with the computer program logic further include transmitting control signals pertaining to at least one electrocoagulation reaction parameter selected from the group consisting of the voltage or current applied by the power source, a temperature in the reaction chamber, a rate of stirring in the reaction chamber, and the separation distance between the electrodes;
if the electrocoagulation reaction parameter is the voltage or current applied by the power source, then control signals are transmitted to the power source to effect an adjustment of the voltage or current applied by the power source;
if the electrocoagulation reaction parameter is the temperature in the reaction chamber, then the electrocoagulation apparatus further comprises a reaction chamber heating device, wherein control signals are transmitted to the reaction chamber heating device to effect an adjustment of the temperature in the reaction chamber;
if the electrocoagulation reaction parameter is the rate of stirring in the reaction chamber, then the electrocoagulation apparatus further comprises a reaction chamber stirring device, wherein control signals are transmitted to the reaction chamber stirring device to effect an adjustment of the rate of stirring in the reaction chamber;
if the electrocoagulation reaction parameter is the separation distance between the electrodes, then control signals are transmitted to effect an adjustment of the separation distance between the electrodes.

9. The electrocoagulation apparatus of claim 1, wherein the acts performed by the computer-controller in accordance with the computer program logic further include transmitting control signals pertaining to at least one electrocoagulation reaction parameter selected from the group consisting of the voltage or current applied by the power source, a temperature in the reaction chamber, a rate of stirring in the reaction chamber, the separation distance between the electrodes, a pH in the reaction chamber, an ion concentration in the reaction chamber, and a flow rate of the electrocoagulation effluent.

10. The electrocoagulation apparatus of claim 1, wherein:
a sludge containing at least some said magnetic iron oxide nanoparticles is formed in association with the electrocoagulation reaction;
the superparamagnetic response of at least substantially all of the magnetic iron oxide nanoparticles to the applied magnetic field results in reduction of at least one of settling time and removal time of the sludge, as compared to the at least one of settling time and removal time resulting from a paramagnetic response of at least substantially all of the magnetic iron oxide particles nanoparticles to the applied magnetic field.

11. The electrocoagulation apparatus of claim 1, wherein the magnetic sensor is selected from the group consisting of Gauss meter and magnetometer.

* * * * *